March 3, 1970     T. J. HAYES ET AL     3,498,724
SAMPLE CELL
Filed Aug. 1, 1967
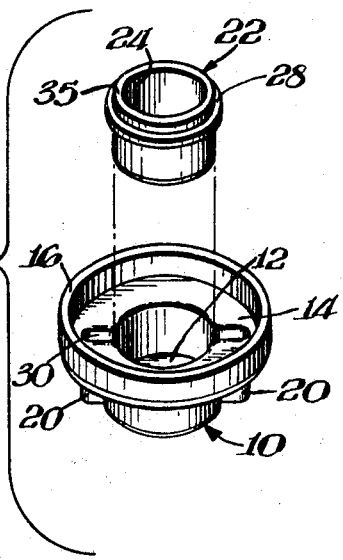
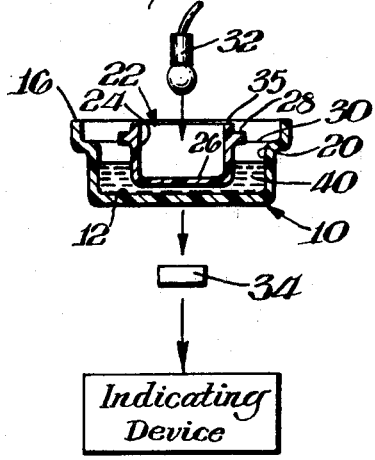
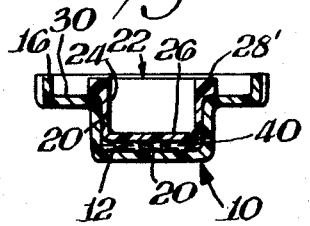
INVENTORS
Thomas J. Hayes
Derek A. Lucas
Robert G. Graves
Harold W. Harrower
BY Mortenson and Weigel
ATTORNEYS 3,498,724
SAMPLE CELL
Thomas J. Hayes, Burlington, Derek A. Lucas, Dover, and Robert G. Graves, Marblehead, Mass., and Harold W. Harrower, Greenville, R.I., assignors to Hewlett-Packard Company, Palo Alto, Calif., a corporation of California
Filed Aug. 1, 1967, Ser. No. 657,673
Int. Cl. G01n 33/16
U.S. Cl. 356—246                     7 Claims

ABSTRACT OF THE DISCLOSURE

A sample cell for use in studies of coagulation and lysis is formed of two parts, a hollow cylindrical cuvette body and a piston-like cap. The body has hollow protuberances disposed axially along its periphery on opposite sides to provide a filling port and venting port. The volume or depth of the sample is controlled by the magnitude of the projection of the piston-like cap into the cylindrical body. Typically two different sized caps are supplied to provide different sample depths.

---

This invention relates to an adjustable thickness sample cell for use in opacity measurements.

It has been necessary over the years to make various opacity measurements of fluids. These measurements frequently are made in connection with surgical as well as other procedures to study the clotting of blood. While the chemical reactions involved in such clotting are rather complex, it is generally agreed that the coagulation mechanism can be studied by measuring the time required for blood to clot. Unfortunately, it is often difficult to observe the clotting of whole blood due to the presence of cellular elements which tend to obscure the reaction. Nevertheless, many of the first techniques employed to study blood coagulation relied upon visual observation to measure the time of formation of a fibrin clot. Measurements made by this technique have not been particularly accurate since observers differ greatly in their ability to determine changes which denote the start of fibrin formation. To say the least, such measurements resulting from these visual observations have been neither accurate nor reproducible. With the continued advances in medicine, the need for the accurate determination of blood coagulation times, rates, etc., have appreciably increased. Such measurements are necessary, for example, in the diagnosis of hemorrhagic conditions, in controlling the effects of drug therapy, and in aiding research.

Since the conversion of fibrinogen into fibrin in the blood is usually accompanied by many changes in the physical as well as chemical properties of the blood as well as plasma, many methods have been devised for measuring the clotting time of blood. Among these methods have been optical methods which have observed changes in the opacity of whole blood or plasma while coagulating. These techniques and methods of detecting, following, and quantitating fibrin formation have utilized cuvettes in which the blood is retained. A beam of light is passed through the cuvette to a photocell which then measures changes in the transmission of light through the cuvette and the sample contained therein.

A patent application filed Nov. 16, 1962, Ser. No. 238,199, now abandoned, by Harrower and Brook describes an instrument for making blood studies which employs two types of cuvettes. One of these types of cuvettes is disposed in the path of a horizontally directed light beam. The second of the types of cuvettes is disposed in the path of a vertically directed light beam. Each type has its own unique use. The use of a cuvette adapted for use with a vertically disposed beam of light has a particular advantage in that it controls the effects of red cell sedimentation which otherwise could distort the various measurements.

Unfortunately, the requirements of a cuvette adapted to accommodate a vertically disposed light beam for use in blood studies are manifold. Among these are that it must be of relatively low cost, easy to disassemble for cleaning if desired, sealable, and yet requires volumes of sample which are relatively small, typically in the order of less than 0.3 cubic centimeter (cc). Such cuvettes should be able to minimize the effects of blood cell settling, prevent retraction of the blood clot from the walls of the cuvette, and yet provide a relatively large surface area through which light can be passed for monitoring. The cuvette should be capable of maintaining stable blood temperature conditions as well as reducing or preventing bubbles which often occur as a result of loading the cuvette. Finally for whole blood measurements, the cuvette must provide a depth of sample which is relatively small. Whole blood strongly attenuates light. For plasma samples the depth can be somewhat larger, but must be reproducible. While some of these requirements have been met in the cuvettes of the past, no cuvette has been designed which solves all of these requirements.

It is therefore an object of the invention to provide an improved cuvette for use in opacity measurements of fluids.

Another object of this invention is to obviate many of the disadvantages inherent in the prior art cuvettes for use in blood coagulation studies.

In a preferred embodiment of the invention, a cuvette for use in blood coagulation and lysis studies consists of two parts, a hollow cylindrical cuvette body closed at one end and a piston-like cap adapted to slide within the cylindrical cuvette body. The body is formed with oppositely disposed hollow protuberances to provide filling and venting ports. These protuberances are formed axially along the periphery of the cylindrical body. The depth of the sample in the cuvette through which the light beam passes is controlled by how far the piston-like cap projects into the body of the cuvette, i.e., how much of the volume of the cuvette body is displaced by the cap. In effect, the cap substitutes an air column through which the light beam passes for the sample. Several caps are provided having different piston lengths so that various sample depths are available. The open ends of both the cuvette body and cap are provided with peripheral flanges. By forming the cap flange to have a diameter less than that of the body flange and by forming a raised peripheral rim on the body flange, a trough is formed which encompasses the filling and venting ports. The trough may be filled with a sealing fluid if desired to seal the blood within the cuvette.

The invention itself both as to its organization and method of operation as well as additional objects and advantages thereof will best be understood from the following description when read in connection with the accompanying drawings, in which:

FIGURE 1 is an exploded pictorial view of a cuvette constructed in accordance with this invention;

FIGURE 2 is a cross-section view of an assembled cuvette along a section line drawn through the protuberances of the cuvette of FIG. 1; and constructed in accordance with this invention, shown in use in an optical system for measuring changes in the light transmission qualities of blood; and FIGURE 3 is a cross-sectional view of an assembled cuvette, taken along a section line rotated 90° from that of FIG. 2, constructed in accordance with another embodiment of this invention.

Blood is a suspension of formed elements, mostly red cells, which will clump or aggregate in a preferred orientation. In their natural state, they are biconcave discs, In the absence of shearing forces such as exist in flowing blood, they tend to clump face to face as a stack of doughnuts. This reduces the scattering area and results in a decrease in opacity when monitored in a cuvette adapted for use with a vertically disposed beam of light. This change in opacity is small compared to the possible change that could occur in a vertically disposed cuvette in a horizontal light beam. Here the change could be great enough to drive the indicating instrument off scale and as a result miss the clotting effect entirely. The use of a cuvette adapted for use with a vertically disposed light beam reduces the effects of red cell sedimentation.

Another advantage of a vertically disposed light beam is realized in the study of lytic activity. This activity pertains to the enzyme system in the blood whose function is to dissolve clots. Thus if observation of a clotted blood sample is continued by a beam of light passing through the sample to a photocell, there is a decrease in opacity of the sample, as evidenced by more light reaching the photocell. This indicates the mechanism of lysis is taking place, i.e., the clot is becoming dissolved. Clots also have a property of retracting from the sides of the vessel that contains them. This retraction could result in erroneous information concerning lytic activity and consequently is to be avoided when possible. The use of the cup shaped cuvettes in accordance with this invention accomplishes this by providing a relatively large contact area between the clot and cuvette so that retraction is reduced.

A cuvette constructed in accordance with this invention is seen in FIGS. 1 and 2. The cuvette consists of a hollow, cylindrical body member 10 having a disc-like closure 12 at one end thereof and an annular peripheral flange 14 at the other end. The peripheral portion of the flange 14 has an outside rim or wall 16 for a purpose as will be described. On opposite interior walls of the cylindrical member 10 are axially disposed side projections or protuberances 20 which are hollow and extend throughout the axial length of the body member 10. These side projections 20 facilitate the introduction of the sample into the cuvette and the purging of air. The disc-enclosure 12 is transparent to the transmission of light through the cuvette, i.e., it is optically clear.

The cap which forms the second portion of the cuvette is designated by the numeral 22. The cap 22 consists of a hollow cylindrical, piston-like element 24 having an outside diameter slightly larger than that of the inside diameter of the cylindrical portion of the cuvette body 10. This provides an interference fit which holds the cap in place. One end of piston-like cap 24 has a disc-like closure 26 which is transparent to permit the transmission of light. The other end of the piston-like cap 24 includes an outwardly extending flange 28 having an outside diameter extending slightly over but not covering the side projections 20. A raised rim 35 is formed around the flange 28 at the inner portion thereof. In this manner, when the cap 22 is inserted into the cuvette member 10, a trough 30 is formed as seen most clearly in FIG. 2. The trough is formed by the inner rims 35, the outer rim 16 and the flange 14. The trough may be filled with mineral oil or other suitable sealant to prevent evaporation losses which is necessary in long term monitoring. The mineral oil or similar sealant effectively seals in the sample without being in the path of the light beam. The vertically disposed beam, as seen in FIG. 2, is from the light source 32 down through the cuvette assembly to a photocell 34. The light may be passed either upwardly or downwardly through the cuvette. The output from the photocell 34 may be amplified and then passed on to an indicating device such as a meter or a recorder.

Further in accordance with this invention, the cap 22 is constructed to have various axial lengths so as to permit greater or lesser sample depths 40. Typically the axial length of the cap 22 relative to the axial length of the cuvette body 10 is such as to provide sample depths, through which the light is transmitted, of 3 mm. for plasma and 0.5 mm. for whole blood. Thus by merely interchanging the caps, various sample size cuvettes may be obtained, whereas a standard size cuvette body is used for all cases.

To use the cuvette, one merely selects a cap 22 having the desired axial length relative to the cuvette body 10, inserts the cap into the cuvette body 10, introduces a hypodermic containing the blood sample, etc. through one of the protuberances 20 and fills the sample volume 40. The displaced air is forced through the remaining one of the protuberances 20. A small amount of mineral oil may be placed in the trough 30 to provide adequate sealing. The cuvette now is placed in the light path as seen in FIG. 2 for the measuring of light transmission.

In another embodiment of this invention, as seen in FIG. 3, a cuvette may be constructed having a body substantially the same as illustrated in FIGS. 1 and 2. Likewise, the cap 22 is of substantially the same construction with one primary exception—the rim 35 is omitted. In its stead the flange 28' suffices to provide the trough 30. If desired the flange 28' may be increased in thickness to have the same height as the rim 35 if a deeper trough is required. It may be noted in FIG. 3 that the cuvette body 10 is rotated 90° such that only one protuberance 20 is observed.

One of the many features of these designs is that the sample is virtually totally enclosed by the cuvette. There is a large contact area between the cuvette and the surrounding heating elements (not shown here). These features contribute to good temperature control. As noted, the side projections 20 on the cuvette body permit easy bubble free loading. Further in accordance with this invention, by forming the cuvette body and cap of any suitable rigid plastic, that permits the transmission of light, the cuvettes may be relatively cheaply constructed so as to be disposable. By the utter simplicity of its parts, the cuvette are easily disassembled for cleaning if desired. Furthermore, the required volumes of sample are relatively small. A typicall cuvette may be made of polymethyl methacrylate plastic (sold under the trade name "Plexiglas"), acrylic plastic, or any other rigid transparent material which is non-reactive with the fluid under test.

There has thus been described a relatively simple cuvette for use in blood coagulation studies which cuvette is disposable, seals the blood sample from the atmosphere, and by the use of interchangeable caps can accommodate samples of varying sizes and provide light transmission paths requiring reduced volume samples.

What is claimed is:

1. An absorption cell capable of presenting plural light sample thicknesses to a beam of light comprising:
    a hollow cylindrical body member having a disc-like closure for one end and an outwardly extending annular flange at the other end, said flange having a peripheral rim,
    said body member having an axis and a predetermined interior axial length, and
    a piston-like, hollow cylindrical cap member for said body member adapted to be introduced into said body member,
    said cap member having a disc-like closure at one end of said member and an outwardly extending annular flange at the other end,
    said cap member cylindrical portion having an axis and an axial length less than said predetermined length,
    each of said disc-like closures including a transparent window portion, and
    wherein the peripheral rim of said body member flange and the annular flange of said cap member together form a trough for retaining a fluid.

2. A light absorption cell according to claim 1 wherein said body member includes an axially disposed, peripheral, hollow protuberance, thereby to facilitate bubble free loading of said cell through said protuberance.

3. A light absorption cell in accordance with claim 2 wherein said cap member includes an inner rim extending axially beyond said flange on said other end, thereby to increase the depth of said trough.

4. A light absorption cell according to claim 3 wherein said cap member annular flange has a diameter greater than the inner diameter of said body member and less than twice the radial distance to the outermost point of said protuberance.

5. A light absorption cell in accordance with claim 4 wherein said cap member is provided in different axial lengths, thereby to vary the sample volume and spacing between said transparent windows.

6. A light absorption cell according to claim 5 which includes two of said protuberances oppositely disposed on said cylindrical body member.

7. A light absorption cell in accordance with claim 1 wherein said cap member is provided in different axial lengths, thereby to vary the sample volume and spacing between said transparent windows.

References Cited

UNITED STATES PATENTS

| | | | |
|---|---|---|---|
| 2,063,222 | 12/1936 | Beau | 356—246 X |
| 2,896,502 | 7/1959 | Nordin | 356—246 X |
| 2,954,472 | 9/1960 | Frenzel | 250—43.5 XR |
| 3,363,503 | 1/1968 | Shifrin | 356—246 |

RONALD L. WIBERT, Primary Examiner

R. J. WEBSTER, Assistant Examiner

U.S. Cl. X.R.

356—39, 40